United States Patent [19]
Nakamoto et al.

[11] Patent Number: 4,593,527
[45] Date of Patent: Jun. 10, 1986

[54] POWER PLANT

[75] Inventors: Yasunobu Nakamoto; Toshiro Terayama, both of Yokohama; Mikio Takayanagi, Tokyo, all of Japan

[73] Assignee: Kabushiki Kaisha Toshiba, Kawasaki, Japan

[21] Appl. No.: 629,818

[22] Filed: Jul. 11, 1984

[30] Foreign Application Priority Data

Jan. 13, 1984 [JP] Japan ................. 59-4509

[51] Int. Cl.⁴ ............. B60H 1/00; B61D 27/00; F01K 13/02
[52] U.S. Cl. ........................ 60/660; 60/667; 165/39; 165/40
[58] Field of Search .......... 165/39, 40; 60/660, 60/664, 665, 667

[56] References Cited

U.S. PATENT DOCUMENTS 3,255,084 6/1966 Doroszlai ................. 165/40
3,382,917 5/1968 Rice ........................ 165/39

OTHER PUBLICATIONS

Vincent, Semon P. and Kostors, Charles H., "Performance Optimization of an OTEC Turbine" Proceedings of the Ocean Thermal Energy Conversion Conference No. 790632, Jun. 19-22, 1979, vol. 1, pp. 8.7-1 through 8.7-6.

Primary Examiner—Allen M. Ostrager
Attorney, Agent, or Firm—Schwartz, Jeffery, Schwaab, Mack, Blumenthal & Evans

[57] ABSTRACT

In a power plant comprising an evaporator for transferring heat to the working fluid from a heat source whose temperature is subject to variation, thereby evaporating a working fluid, and a turbine driven by the evaporated working fluid, the temperature of the heat source is detected, an optimum physical value relating to the evaporation at the evaporator is caluculated in accordance with the detected temperature, and evaporation of the working fluid at the evaporator is controlled in accordance with the calculated optimum value.

20 Claims, 5 Drawing Figures

POWER PLANT

BACKGROUND OF THE INVENTION

The present invention relates to a power plant.

An example of power plant is an ocean thermal energy conversion (hereinafter referred to as OTEC) plant, which utilizes warm surface seawater (e.g., of 25°–30° C.) as a high temperature heat source and cold deep seawater (e.g., of 5°–7° C.) in the depth of several hundreds to about a thousand meters, as a low temperature heat source, and has a Rankine cycle operated by the temperature difference (of about 20° C.) to drive a turbine.

The high temperature heat source of this type of plant is dependent on the sun. In the equatorial sea area, the temperature of the surface seawater is high and its seasonal change is small, so that the equatorial sea area is ideal for this type of plant. In contrast, in the high latitude area including Japan, the temperature of the surface seawater varies largely depending on the seasons and is low in winter causing substntial reduction in the turbine output. For example, decrease of the temperature by 1° C. causes as much as 50% reduction in the turbine output. For this reason, OTEC plants in the high latitude area, even those of most favorable location, can be operated only in several months a year. Therefore, the utility factor of the equipment is low and the system is not economical.

SUMMARY OF THE INVENTION

An object of the invention is to provide a power plant which is capable of producing power at a maximum efficiency even at a lowered temperature of the heat source and which therefore keeps a high utility factor and an improved economy even where the seasonal change of temperature is substantial.

According to the invention, when the temperature of the high temperature heat source to be supplied to the evaporator is decreased, an optimum physical value relating to evaporation is determined and the evaporation of the working fluid is controlled according to the optimum physical value thus determined. The optimum physical value relating to evaporation mentioned above means either an optimum evaporating temperature or an optimum evaporating pressure, which corresponds to the optimum evaporating temperature.

DETAILED DESCRIPTION OF THE PREFERRED EMBODIMENT

Figure 1:
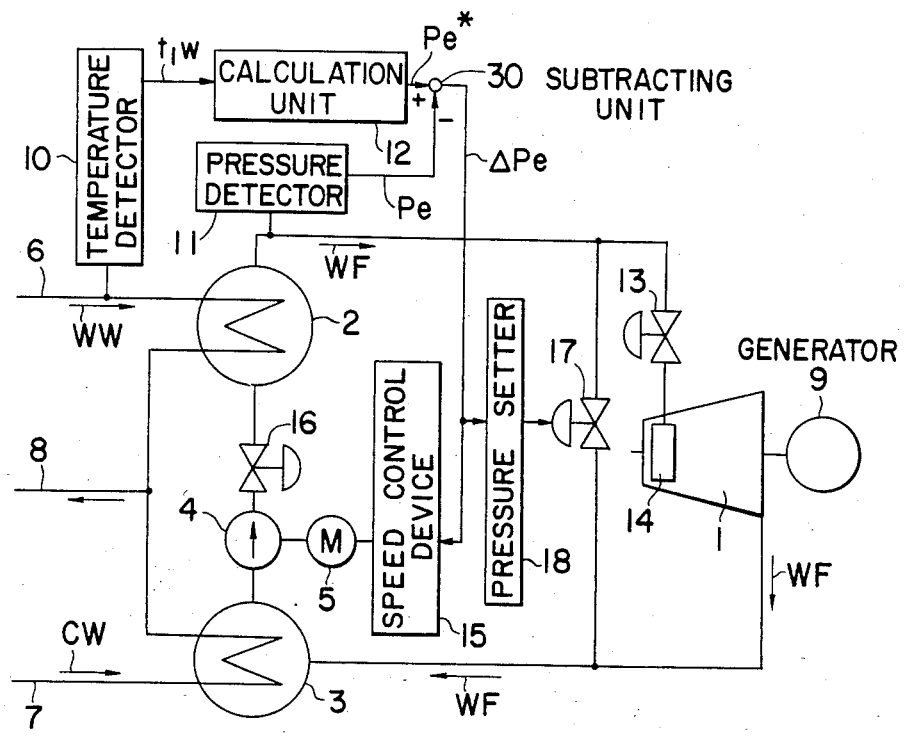
FIG. 1 is a schematic diagram showing an embodiment of a power plant according to the invention.

An embodiment shown in FIG. 1 is an OTEC plant taken as an example of the power plant according to the invention.

As illustrated in FIG. 1, warm water WW at the surface of an ocean is pumped up through a warm seawater intake pipe 6 and is passed through an evaporrator 2, where heat is transferred from the warm seawater WW to a turbine working fluid WF, e.g., freon to evaporate the working fluid WF. The warm seawater WW is then discharged through a discharge pipe 8. Cold seawater CW in the depth of the ocean is pumped up through a cold seawater intake pipe 7 and is passed through a condensor 3, where heat is transferred from the working fluid WF to the cold seawater CF to cause condensation of the working fluid WF. The cold seawater CW is discharged through the discharge pipe. Incidentally, it is noted that separate discharge pipes may be provided, in place of the common discharge pipe 8, for the warm seawater WW and the cold seawater CW, respectively.

The turbine working fluid WF is heated and evaporated in the evaporator 2 and is expanded in a hydroturbine 1 to drive the hydroturbine 1. The working fluid WF is thereafter condensed and liquified in the condenser 3 giving heat to the cold seawater CW. The working fluid WF is then boosted by a working fluid feed pump 4 and is thereby conducted to the evaporator 2 again. Thus, in the embodiment illustrated, the working fluid WF circulates through a closed path.

In the conventional system, the evaporating pressure in the evaporator 2 is kept constant at a designed point even when the temperature of the warm seawater WW becomes lower than the designed value, reducing the difference between the warm seawater temperature and the cold seawater temperature. As a result, duty of the heat exchanger is substantially reduced. This reduction is at a greater degree than the reduction of the temperature difference. This in turn leads to reduction in the flow rate of the working fluid flowing into the turbine 1 with the result that the turbine 1 becomes in a partial load state. In this state, the opening of the control valve 13 is reduced, so that the inlet pressure at the turbine nozzle 14 is decreased in proportion to the flow rate. Accordingly, adiabatic heat drop is reduced. The output power of the turbine 1 is essentially proportional to the product of the flow rate and the heat drop. When these two are decreased simultaneously, the turbine output is substantially decreased. For this reason, with an OTEC plant in which the inherently utilizable temperature difference is small, reduction in the warm seawater temperature of 1° C. causes reduction of as much as 50% in the output.

This problem is solved by the present invention, in accordance with which a physical value relating to evaporation, i.e., an optimum evaporation pressure or an evaporation temperature corresponding thereto is determined for any given varied temperature of the warm seawater when such variation occurs and the evaporation in the evaporator 2 is controlled in accordance with the determined optimum physical value.

Here the optimum evaporation temperature (or the optimum evaporation pressure corresponding thereto) is a value which maximizes the output of the turbine 1 for the given varied warm seawater temperature. The inventors have found that such value is the lowest evaporation pressure or temperature that produces the maximum evaporated flow rate within a range in which the turbine bypass valve 17 does not open. The optimum value may for example be determined in the following manner.

First, target difference $\Delta t_e$ by which the evaporating temperature should be varied from the designed value in response to given difference $\Delta t_{1w}$ of the warm seawater temperature from the designed value is determined in accordance with the following equation (1).

$$\Delta t_e = C \cdot \Delta t_{1w} \ldots (1)$$

Here, C represents a pressure variation coefficient or, rather, what is called a sliding pressure coefficient, which is dependent on the warm seawater temperature and the cold seawater temperature, as well as characteristics of various components including the evaporator 2, the turbine 1, the control valve 13, the turbine nozzle 14 and the condenser 3. It is not dependent on whether or not the evaporator 2 is provided with a superheater.

For instance, for a fixed area nozzle system, approximation giving the coefficient C is derived in a manner described below. First, it is known that the following relationship holds for an evaporator under a given condition.

$$\frac{t_{1w} - t_e}{t_{2w} - t_e} = a_e \quad (2)$$

where, $$a_e = e^{\frac{K_e \cdot A_e}{G_w \cdot C_{pw}}}$$

Here,
$t_{1w}$ represents the warm seawater temperature (operating point) at the evaporator inlet,
$t_{2w}$ represents the warm seawater temperature (operating point) at the evaporator outlet,
$t_e$ represents the evaporating temperature (operating point) of the working fluid,
$K_e$ represents a heat transfer coefficient of evaporation,
$A_e$ represents the heat transfer area of the evaporator,
$G_w$ represents the warm seawater flow rate, and
$C_{pw}$ represents the specific heat of the warm seawater.

The evaporated flow rate $G_s$ of the working fluid is given by the following equation (3).

$$G_s = a \cdot (t_{1w} - t_{2w}) \ldots (3)$$

where, $$a = \frac{G_w \cdot C_{pw}}{h_e - h_c}$$

Here,
$h_e$ represents the enthalpy (operating point) of the evaporated vapor of the working fluid, and
$h_c$ represents the enthalpy (operating point) of the condensate of the working fluid.

The sliding pressure coefficient C is defined by the following equation.

$$C = \frac{t_{ed} - t_e}{t_{1wd} - t_{1w}} \quad (4)$$

Here, $t_{ed}$ represents the evaporating temperature (designed point) of the working fluid, and
$t_{1wd}$ represents the warm seawater temperature (designed point) at the evaporator inlet.

From equation (4), $$t_e = t_{ed} + C \cdot (t_{1w} - t_{1wd}) \ldots (5)$$

From equation (2), $$t_{2w} = \frac{a_e - 1}{a_e} \cdot t_e + \frac{1}{a_e} \cdot t_{1w} \quad (6)$$

From equations (5), (6) and (3), $$G_s = a \cdot \frac{a_e - 1}{a_e} \cdot (E \cdot C + F) \quad (7)$$

where $E = t_{1wd} - t_{1w}$ and $F = t_{1w} - t_{ed}$.

The maximum flow rate at which the vapor of the working fluid may be passed through a given turbine is determined by:

$$G_t = \phi \cdot P_B \cdot \frac{\sqrt{1 - \left(\frac{P_3}{P_B}\right)^2}}{\sqrt{273 + t_B}} \quad (8)$$

where
$G_t$ represents the turbine inlet flow rate,
$\phi$ represents the turbine flow coefficient,
$P_B$ represents the turbine nozzle inlet pressure,
$t_B$ represents the turbine nozzle inlet temperature, and
$P_3$ represents the turbine exhaust pressure.

The coefficient C is so determined that the vapor produced is all passed through the turbine. However, the following approximations are assumed.

$$t_B = t_e \ldots \quad (9)$$

$$P_B = P_e \ldots \quad (10)$$

$$P_3 = P_c \ldots \quad (11)$$

Here,
$P_e$ represents the evaporating pressure (operating point) of the working fluid, and
$P_c$ represents the condensing pressure (operating point) of the working fluid.

Moreover, it is assumed that the correlation between the saturation pressure and the saturation temperature is approximated by a linear expression, that is the following expressions hold.

$$P_e = H \cdot t_e + b \ldots \quad (12)$$

$$P_c = H \cdot t_c + b \ldots \quad (13)$$

where
H and b represent constants, and
$t_c$ represents the condensing temperature (operating point) of the working fluid.

The equation (2) is a fundamental expression for a heat exchanger and is hence also applicable to a condenser, so that $$\frac{t_{1c} - t_c}{t_{2c} - t_c} = a_c \quad (14)$$

where $$a_c = e^{\frac{K_c \cdot A_c}{G_c \cdot C_{pc}}}$$

Here, $t_{1c}$ represents the cold seawater temperature (operating point) at the condenser inlet, $t_{2c}$ represents the cold seawater temperature (operating point) at the condenser outlet, $K_c$ represents the heat transfer coefficent of the condensation, $A_c$ represents the heat transfer area of the condenser, $G_c$ represents the cold seawater flow rate, and $C_{pc}$ represents the (constant pressure) specific heat of the cold seawater.

On the assumption that the heat duty of the condenser varies in proportion to the heat duty of the evaporator, the following equation is derived by modifying the equation (14).

$$t_c = \frac{\log_e a_c}{\log_e a_e} \cdot \frac{a_e - 1}{a_e} \cdot \frac{a_c}{a_c - 1} \cdot (E \cdot C + F) + t_{1cd} \quad (15)$$

where $t_{1cd}$ represents the cold seawater temperature (designed point) at the condenser inlet.

In the OTEC plant, $$a_e \approx a_c$$

so that the equation (15) may be replaced by the following approximation.

$$t_c = E \cdot C + F + t_{1cd} \ldots \quad (16)$$

From the equation (5), $$t_e = t_{ed} - E \cdot C \ldots \quad (17)$$

The equation (16) is substituted in the equation (13), and the equation (17) is substituted in the equation (12), and they are finally incorporated in the equation (8). Then, $G_s$ of the equation (7) and $G_t$ of the equation (8) are put equal to each other. As a result, the following quadratic equation in which C is unknown is obtained.

$$X \cdot C^2 + Y \cdot C + Z = 0 \ldots \quad (18)$$

where, $$X = \alpha^2 \cdot E^2 \cdot (t_e + 273) \cdot \left(\frac{a_e - 1}{a_e}\right)^2$$

$$Y = 2 \cdot E \cdot F \cdot \alpha^2 \cdot (t_e + 273) \cdot \left(\frac{a_e - 1}{a_e}\right)^2 +$$

$$2 \cdot E \cdot \phi^2 \cdot H \cdot \{H \cdot (t_{ed} + t_{lcd} + F) + 2 \cdot b\}$$

-continued $$Z = \alpha^2 \cdot F^2 \cdot (t_e + 273) \cdot \left(\frac{a_e - 1}{a_e}\right)^2 -$$

$$\phi^2 \cdot H \cdot \{H \cdot (t_{ed} + t_{lcd} + F) + 2 \cdot b\} \cdot (t_{ed} - t_{lcd} - F)$$

The solution of the equation (18), namely, $$C = \frac{-Y \pm \sqrt{Y^2 - 4 \cdot X \cdot Z}}{2 \cdot X} \quad (19)$$

is the sliding pressure coefficient expressed by a theoretical approximation. In other words, the coefficient C may be used for the calculation of the equation (1). It should be noted that the equation (19) is derived through several assumptions and approximations as shown in the description on how the equation (19) is derived. In specific application, stricter calculations may sometimes be required, or simpler calculations may sometimes suffice.

When the optimum evaporating temperature is determined in a manner described above, then the optimum evaporating pressure is determined based on the optimum evaporating temperature. Since the evaporating pressure and the evaporating temperature are in saturated condition, this determination or conversion can be easily made utilizing a known formula concerning the working fluid used.

To implement evaporation at the optimum evaporating pressure (and hence at the optimum evaporating temperature) for a given varied temperature of the warm seawater, the warm seawater temperature is detected by a temperature detector 10, and its output signal indicative of the detected temperature $t_{1w}$ is supplied to a calculation unit 12. The calculation unit 12 determines or calculates, in a manner described in detail later, the optimum evaporating pressure. Then the evaporated pressure at the evaporator 2 is regulated in accordance with the thus calculated optimum evaporating pressure. In the illustrated embodiment, the evaporator outlet pressure is detected by a pressure detector 11 and is compared with the calculated optimum evaporating pressure at a comparator 30, and the pressure regulation or control is so conducted that the deviation is kept as small as possible. The pressure regulation can be accomplished in any of the various ways. But in the illustrated embodiment, the working fluid feed pump 4 is driven at a variable speed by a pump drive unit 5, and the speed control unit 15 controlling the speed is supplied with a correction signal $\Delta P_e$ indicative of the above-mentioned deviation. Where the pump drive unit 5 comprises an electric motor, the speed control unit 15 having phase-controlled thyristors incorporated therein may be used. Alternatively, the pump drive unit 5 may comprise one with a torque converter.

Figure 2:
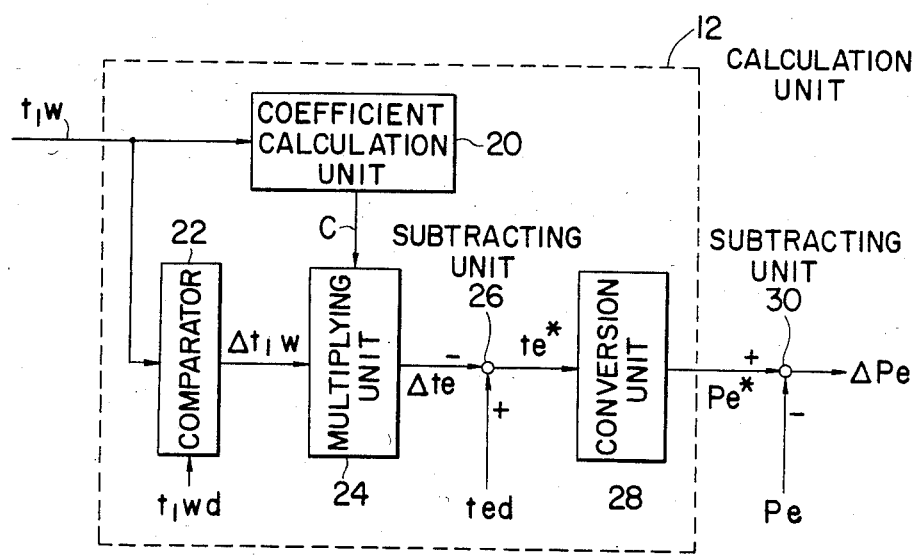
FIG. 2 is a block diagram showing an example of the calculation unit 12 of FIG. 1.

FIG. 2 shows an example of the calculation unit 12 for determining the optimum evaporating temperature and the optimum evaporating pressure corresponding thereto. The signal indicative of the warm seawater temperature $t_{1w}$ as detected by the temperature detector 10 is supplied both to a sliding pressure coefficient calculation unit 20 and to a comparator 22.

The coefficient calculation unit 20 determines the sliding pressure coefficient C based on the warm seawater temperature $t_{1w}$ and other factors, and in accordance with, e.g., the equation (19). Here, arrangement is shown to be that only the warm seawater temperature $t_{1w}$ is supplied from outside of the unit 20, and other factors have predetermined values which are preset in the unit 20. Alternatively, those factors which are subject to variation may be detected and the detected values may be used. Incidentally, the enthalpy of the evaporated vapor $h_e$ is determined from the evaporating pressure (or temperature), while the enthalpy of the condensate $h_c$ is determined from the condensing pressure (or temperature).

The comparator 22 compares the detected warm seawater temperature $t_{1w}$ with the designed value $t_{1wd}$ (e.g., 30° C.) of the warm seawater temperature, and produces a signal indicative of the difference or decrease $\Delta t_{1w} = t_{1wd} - t_{1w}$.

A multiplying unit 24 multiplies the difference $\Delta t_{1w}$ by the coefficient C. The product gives the target value (the optimum value) $\Delta t_c$ of the difference of the evaporating temperature.

A subtracting unit 26 subtracts the target value $\Delta t_e$ of the difference from the designed value $t_{ed}$ (e.g., 25° C.) of the evaporating temperature to provide an optimum evaporating temperature $t_e^*$.

A conversion unit 28 determines an optimum evaporating pressure $P_e^*$ corresponding to the optimum evaporating temperature $t_c^*$. This conversion is accomplished using a known formula since the evaporating pressure and the evaporating temperature are in saturated relationship. The optimum evaporating pressure $P_e^*$ thus determined constitutes an output of the calculation unit 12 and is used as a target value for control of evaporation.

As mentioned above, the subtracting unit 30 determines a deviation $\Delta P_e$ of the actual pressure $P_e$ from the optimum evaporating pressure $P_e^*$.

A signal indicative of the deviation $\Delta P_e$ is supplied as a correction signal to a speed control device 15 to be used for speed control of the motor 5 driving the pump 4. The speed of the pump 4 is thereby so controlled as to make the deviation $\Delta P_e$ smaller (closer to zero).

The signal indicative of $\Delta P_e$ is also supplied to a pressure setter 18 to adjust the set pressure value for the turbine bypass value 17 such that the set pressure value is a little higher than the optimum evaporating pressure $P_e^*$.

The power plant described above is capable of operating at an optimum state, at a maximum efficiency whatever is the warm seawater temperature. For instance, even when the warm seawater temperature is decreased, the decrease in the turbine output is minimized. Decrease in the output of the generator driven by the turbine is therefore reduced. As a result, decrease in the annual net power output (watthour) due to seasonal change in the warm seawater temperature is smaller.

Figure 3:
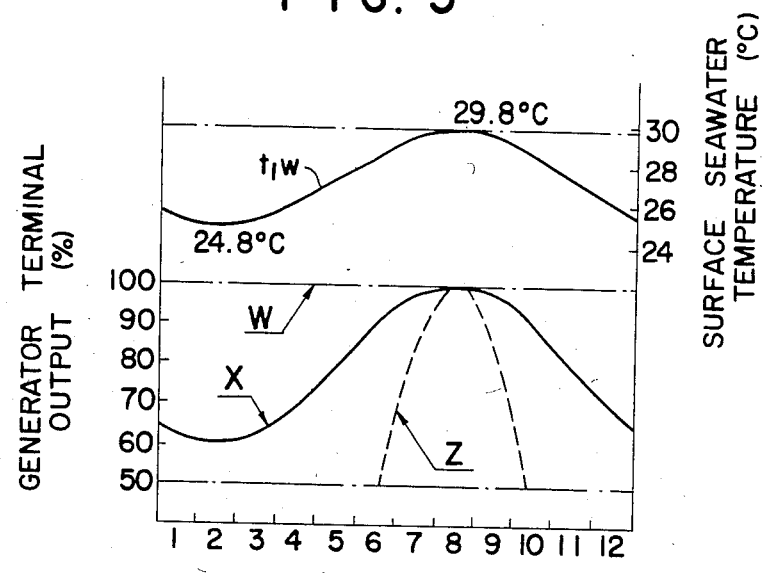
FIG. 3 shows the relation between the seasonal change in surface seawater temperature vs. generator terminal output.

FIG. 3 shows an example of result of trial calculation of variation of the power through the year in an attempt to illustrate how the annual amount of power output is reduced. It is assumed that the variation made of surface (warm) seawater temperature $t_{1w}$ is modeled on a sine curve with an amplitude (from bottom to peak) of 5° C. and with the peak point (highest value) coincident with the designed point. It is also assumed that the station service power is 50% of the rated generator output and is constant regardless of the generator output power. The broken line Z represents the seasonal variation of the generator output of a conventional OTEC plant. It is clear from the curve Z that the conventional OTEC plant is capable of providing or transmitting power (net power) during part only of the year, and the annual net power is about 20% of that of an OTEC plant at an ideal site (where there is no temperature decrease throughout the year: the generator net power output is shown by a chain line W). In contrast, an OTEC plant according to the invention is capable of providing or transmitting power even in cold season although the amount of power transmitted is smaller, and the annual net power is about 60% of that of an OTEC plant at an ideal site.

Moreover, where the control of the evaporating pressure is achieved by control of the working fluid feed pump 4, the station service power is reduced when the warm seawater temperature is lowered, so that the net power available for transmission is increased. As an example, the driving power for the pump at the designed point constitutes about 15% of the station service power, and accordingly decrease in such driving power has a remarkable effect.

In the embodiment described above, the coefficient C which is theoretically derived was used. But a coefficient C determined through experiments may alternatively be used. In any case, the coefficient C does not vary widely, and is for instance within the range of $0.80 \pm 0.15$ where the turbine nozzle is of a fixed area type, and is for instance within the range of $1.0 \pm 0.4$ where the turbine nozzle is a variable area type. Therefore, a constant value may be used as the coefficient C where the range of variation of the coefficient is small.

Figure 4:
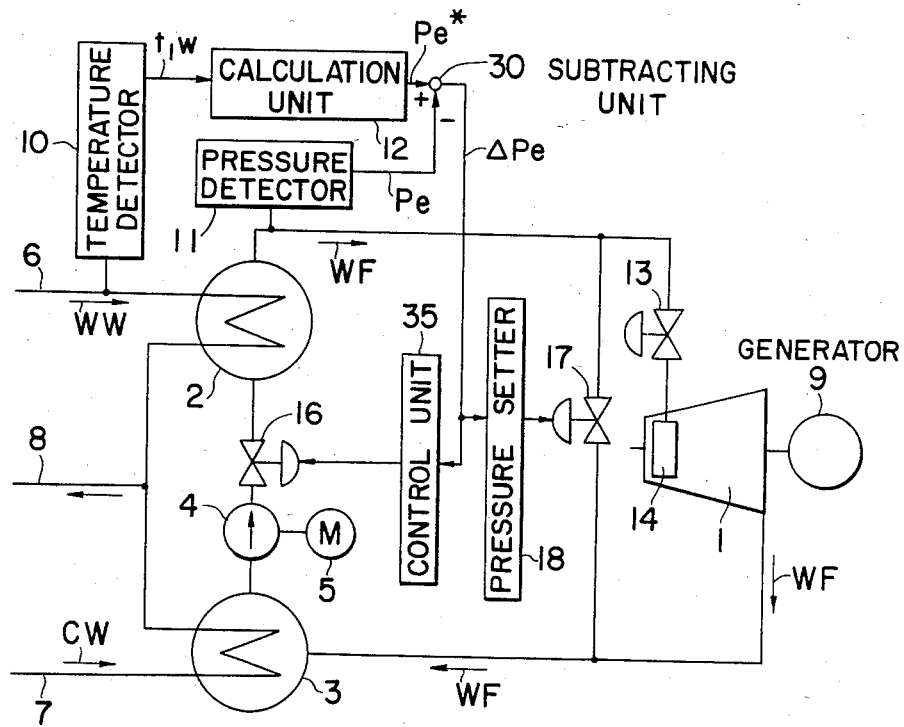
FIG. 4 is a schematic diagram showing another embodiment of a power plant according to the invention.

In the embodiment described above, the pump 4 is driven at a variable speed. But alternatively the opening (position) of the pressure controlled valve may be varied to control the evaporation at the evaporator. In such a case, the output of the subtracting unit 30 is applied to a control unit 35 (FIG. 4), by means of which the pressure control valve 16 is controlled. Still alternatively, a variable area nozzle may be used as the turbine nozzle and its area may be varied to adjust the evaporating pressure.

Figure 5:
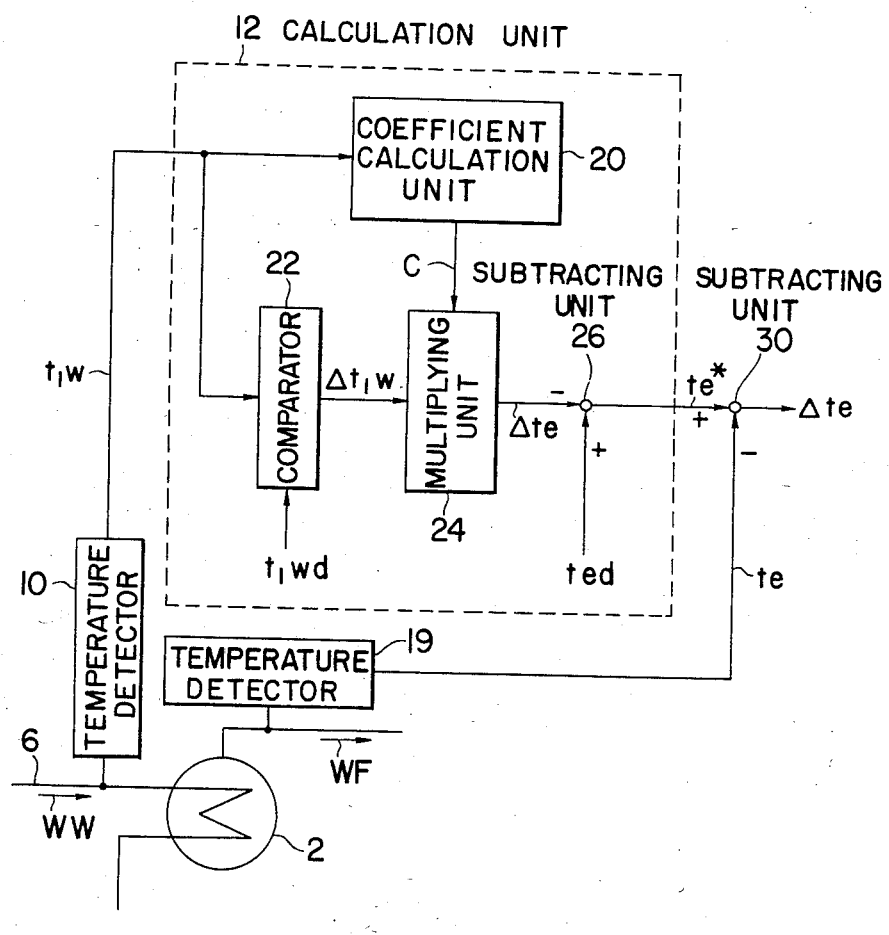
FIG. 5 is a block diagram showing a modified calculation unit 12', a temperature detector 19 and a subtracting unit 30.

Instead of controlling the evaporation in accordance with the optimum evaporating pressure, the control may be made in accordance with an optimum evaporating temperature. In such a case, the arrangement as shown in FIG. 5 may be used. As illustrated, the conversion unit 28 in FIG. 2 is not required, a temperature detector 19 is provided to detect the temperature of the working fluid at the evaporator outlet, and the subtracting unit 30 determines a temperature deviation rather than the pressure deviation, and the temperature deviation is used for control of the evaporation.

The invention is not limited to an OTEC plant but is applicable to any power plant using a high temperature heat source whose temperature varies, e.g., a solar pond, an industrial waste-heat recovery plant. The heating fluid supplied to the evaporator is not limited to a liquid but may alternatively be a gas.

The turbine cycle may not necessarily be a closed loop type as that of the embodiments, but may alternatively be an open loop type (where the working fluid is not circulated).

As has been described, according to the invention, even where the heat source temperature is varied, the control is made to maximize the turbine output at the varied temperature. As a result, even where the seasonal change in the heat source temperature is substantial, the utility factor of the power plant is higher and the annual net power output is greater. These all contribute to economization.

What is claimed is:

1. A power plant comprising:
an evaporator for transferring heat to a working fluid from a heat source whose temperature is subject to variation, thereby evaporating the working fluid;
a turbine driven by the evaporated working fluid;
means for detecting the temperature of the heat source;
means for calculating an optimum value of a physical parameter of the working fluid relating to the evaporation at the evaporator in accordance with the detected temperature; and
means for controlling in accordance with said calculated optimum value, evaporation of the working fluid at the evaporator comprising:
(a) means for detecting an actual value of said physical parameter of the working fluid at the outlet of the evaporator;
(b) means for determining the deviation of the detected actual value of said physical parameter from the calculated optimum value; and
(c) means for controlling the evaporation in accordance with the deviation.

2. A power plant according to claim 1, further comprising a pump driven at a variable speed and feeding the working fluid to the evaporator, wherein the control means comprises means for adjusting the rotating speed of the pump in accordance with the calculated optimum physical value.

3. A power plant according to claim 1, further comprising a control valve for adjusting the pressure of the working fluid fed to the evaporator, wherein the control means comprises means for adjusting the opening of the control valve in accordance with the calculated optimim physical value.

4. A power plant according to claim 1, wherein the calculation of said optimum physical value comprises calculation of an optimum evaporating temperature, and said calculating means calculates the optimum evaporating temperature $t_e^*$ in accordance with the following equation:

$$t_e^* = t_{ed} - \Delta t_e$$

where $t_{ed}$ represents the designed value of the evaporating temperature, and
$\Delta t_e$ represents the required difference of the evaporating temperature from its designed value, which is determined by the following equation $$\Delta t_e = C \cdot \Delta t_{1w}$$

'where $\Delta t_{1w}$ represents the difference of the detected value of the heat source temperature from its designed value of the heat source temperature, and
C represents a coefficient so determined as to maximize the evaporated flow rate in the condition that all the vapor produced in the evaporator is flowed into the turbine.

5. A power plant according to claim 4, wherein said optimum physical value is in the form of the optimum evaporating temperature.

6. A power plant according to claim 4, wherein said calculating means determines, from the optimum evaporating temperature, a corresponding optimum evaporating pressure $P_e^*$, and said optimum physical value is in the form of the optimum evaporating pressure.

7. A power plant according to claim 4, wherein the calculation means determines the coefficient C from the detected value of the heat source temperature and predetermined parameters and determines, in accordance with the thus determined coefficient C, the required difference $\Delta t_e$.

8. A power plant according to claim 4, wherein the calculating means determines the required difference $\Delta t_e$ using a fixed coefficient C.

9. A power plant according to claim 1, wherein said optimum value is an optimum evaporating temperature.

10. A power plant according to claim 1, wherein said optimum value is an optimum evaporating pressure.

11. A method of operating a power plant comprising:
an evaporator for transferring heat to a working fluid from a heat source whose temperature is subject to variation, thereby evaporating the working fluid; and
a turbine driven by the evaporated working fluid,
said method comprising the steps of:
detecting the temperature of the heat source;
calculating an optimum value of a physical parameter of the working fluid relating to the evaporation at the evaporator in accordance with the detected temperature; and
controlling, in accordance with said calculated optimum value, evaporation of the working fluid at the evaporator by detecting an actual value of said physical parameter of the working fluid at the outlet of the evaporator determining the deviation of the detected actual value of said physical parameter from the calculated optimum value, and controlling the evaporation in accordance with the deviation.

12. A method according to claim 11, wherein said power plant further comprises a pump driven at a variable speed and feeding the working fluid to the evaporator, and the controlling step comprises adjusting the rotating speed of the pump in accordance with the calculated optimum physical value.

13. A method according to claim 11, wherein said power plant further comprises a control valve for adjusting the pressure of the working fluid fed to the evaporator, and the controlling step comprises adjusting the opening of the control valve in accordance with the calculated optimum physical value.

14. A method according to claim 11 wherein the calculation of said optimum physical value comprises calculation of an optimum evaporating temperature, and the calculating step comprises calculating the optimum evaporating temperature $t_e^*$ in accordance with the following equation:

$$t_e^* = t_{ed} - \Delta t_e$$

where $t_{ed}$ represents the designed value of the evaporating temperature, and
$\Delta t_e$ represents the required difference of the evaporating temperature from its designed value, which is determined by the following equation:

$$\Delta t_e = C \cdot \Delta t_{1w}$$

where $\Delta t_{1w}$ represents the difference of the detected value of the heat source temperature from its designed value of the heat source temperature, and
C represents a coefficient so determined as to maximize the evaporated flow rate in the condition that all the vapor produced in the evaporator is flowed into the turbine.

15. A method according to claim 14, wherein said optimum physical value is it the form of the optimum evaporating temperature.

16. A method according to claim 14, wherein the calculating step comprises determining, from the optimum evaporating temperature, a corresponding optimum evaporating pressure $P_e^*$, and said optimum physical value is in the form of the optimum evaporating pressure.

17. A method according to claim 14, wherein the calculating step comprises determining the coefficient C from the detected value of the heat source temperature and predetermined parameters and determining, in accordance with the thus determined coefficient C, the required difference $\Delta t_e$.

18. A method according to claim 14, wherein the calculating step comprises determining the required difference $\Delta t_e$ using a fixed coefficient C.

19. A method according to claim 11, wherein said optimum value is an optimum evaporating temperature.

20. A method according to claim 11, wherein said optimum value is an optimum evaporating pressure.

* * * * *